3,600,340
POLYURETHANE FOAM
John T. Patton, Jr., Wyandotte, and Louis C. Pizzini, Trenton, Mich., assignors to BASF Wyandotte Corporation, Wyandotte, Mich.
No Drawing. Filed June 30, 1969, Ser. No. 837,882
Int. Cl. C08g 22/44, 41/04, 51/14
U.S. Cl. 260—2.5
2 Claims

ABSTRACT OF THE DISCLOSURE

Resilient cellular material comprising a cellular mass of polyurethane and fine particles of polyethylene resin.

Polyurethane compositions are usually regarded as the reaction product of a polyisocyanate and an active hydrogen-containing organic compound such as a hydroxy-terminated polyester, polyesteramide, or polyether. The term "active hydrogen atoms" refers to hydrogens which display activity according to the Zerewitinoff test, as described by Kohler in J. Am. Chem. Soc., 49, 3181 (1927). By providing an excess of polyisocyanate in the reaction mixture and by adding water during the chain extension and cross-linking phases of the reaction, the polyurethane product can be obtained as a foam useful for insulation, comfort cushioning, and the like. Also, a cross-linking compound or chain extender, such as a polyol or polyfunctional amine, may be added to aid in polymer formation.

In general, the art has developed various methods of manufacturing polyurethane foams. The preparation of polyurethanes is disclosed in many references, including the texts entitled Polyurethanes by Bernard A. Dombrow, published by Reinhold Publishing Corporation, New York, New York, 1957, and Polyurethanes: Chemistry and Technology by J. H. Saunders and K. C. Frisch, published by Interscience Publishers, New York-London, wherein disclosures are made of methods for producing polyurethanes.

In the prepolymer method of manufacturing polyurethane foams, the polyisocyanate, in stoichiometric excess, is first reacted with an active hydrogen-containing high molecular weight organic compound whereby a "prepolymer" is formed. The "prepolymer" and water are then mixed together, whereupon the "prepolymer" polymerizes and cross-links while excess polyisocyanate and water react to produce carbon dioxide gas which functions as the blowing agent. The reaction of the water with free isocyanate or isocyanate radicals produces, besides the carbon dioxide, an amine and the thus-produced amine reacts with other free isocyanate or isocyanate radicals to create urea linkages in the foam.

It is possible in many cases and economically advantageous to prepare urethanes by a "one-step" or "one-shot" process in which all the components necessary are simply blended together and poured into a mold of suitable configuration or made into slab or bun-stock by pouring onto a moving belt so as to form a continuous bun of foam and cured.

In some applications, solvent-type foaming agents such as fluorochloromethanes are employed as a substitute for, or partial substitute for, the carbon dioxide produced by the polyisocyanate-water reaction.

A wide variety of solid materials have been added to polyurethane foams in the past to produce changes in properties, particularly to improve load-bearing characteristics. These solid materials which can be described as fillers include finely divided solid particles or powders, large granular or particulate solids and fibrous materials. Suitable fillers which have been employed in the prior art include barium sulfate, zircon sand, calcium carbonate and the like and organic fillers such as shredded cornstalks, straw, hay, and the like. However, while addition of these materials may improve load-bearing properties, other properties of the foams produced are often degraded.

Accordingly, it is a purpose of this invention to provide resilient polyurethane foams which are chaarcterized by improved load-bearing properties without corresponding reduction in other desirable properties to the extent obtained by the incorporation of prior art filler materials in the foam.

It is a further purpose of the instant invention to provide resilient polyurethane foams which are superior in general to prior art foams in characteristics, such as more uniform continuous skin, better pad definition, and more open-cell structure at higher tin catalyst levels. Further, it is a purpose of this invention to produce resilient polyurethane foams wherein the use of mold release compounds in preparing molded foams is either eliminated or substantially reduced.

These and other purposes of the instant invention are achieved by incorporating in a conventional polyurethane foam fine polyethylene powders and, more particularly, micro-fine polyethylene powders.

In a preferred embodiment of the instant invention, the polyethylene powders have a weight average molecular weight ranging from about 100,000 to 1,000,000, a particle size ranging from about 3 to 1000 microns, preferably about 3 to 50 microns, and comprise from about 2 to 50% of the total weight of the foam product.

In producing the desired product, the prepolymer method may be employed and the polyethylene powder may be mixed with either the prepolymer or the chain extender or both prior to mixing the isocyanate-terminated prepolymer with the chain extender. Where a "one-shot" process is employed all of the reactants, including the polyethylene powders, may be mixed together at once or the "premix" type of "one-shot" procedure may be employed wherein polyisocyanate is separated from the glycol or polyol ingredients until the actual mixing. In this case the polyethylene powder may be mixed with either the polyisocyanate component, the polyol component, or both. This invention is applicable with the use of water and/or the solvent type of foaming agent.

The foams are usually cured at a temperature from about 25° C. to 200° C. For example, the foams may be aged for one week at 25° C. and 50% relative humidity, at the end of which time essentially all of their strength is attained. Shorter curing times are possible at higher temperatures.

In a preferred embodiment of this invention, for reasons of their greater economy, polyoxyalkylene polyols are preferred as the hydrogen-containing component. These polyols include, for example, the oxyalkylene adducts of polyol bases wherein the oxyalkylene portion is derived from monomeric units such as ethylene oxide, propylene oxide, butylene oxide and mixtures thereof. The polyol bases include ethylene glycol, 1,2-propylene glycol, 1,3-propylene glycol, 1,2-butanediol, 1,4-butanediol, hexanetriol, glycerol, trimethylolpropane, pentaerythritol, sorbitol and sucrose; polyethers such as polyethylene ether glycols, polypropylene ether glycols, polytetramethylene ether glycols, and alkylene oxide adducts of polyhydric alcohols including those listed above; hydroxy-terminated tertiary amines of the formula:

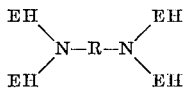

wherein R is an alkylene radical containing at least 2 to 6 carbon atoms and E is a polyoxyalkylene chain; amine-based polyethers of the formula:

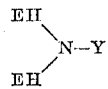

wherein E is a polyoxyalkylene chain and Y is selected from the group consisting of alkyl, hydroxyalkyl, and EH; alkylene oxide adducts of acids of phosphorus such as adducts prepared by the reaction of phosphoric acid and ethylene oxide, phosphoric acid and propylene oxide, phosphorous acid and propylene oxide, phosphonic acid and ethylene oxide, phosphinic acid and butylene oxide, polyphosphoric acid and propylene oxide, and phosphonic acid and styrene oxide; and polyesters such as the reaction products of a polyhydric acid including those listed above and a dibasic carboxylic acid such as succinic acid, maleic acid, adipic acid, phthalic acid and terephthalic acid.

Typical polyether polyols include polyoxyethylene glycol, polyoxypropylene glycol, polyoxybutylene glycol, polytetramethylene glycol, block copolymers, e.g., combinations of polyoxypropylene and polyoxyethylene glycols, poly-1,2-oxybutylene and polyoxyethylene glycols and poly-1,4-oxybutylene and polyoxyethylene glycols, and random copolymer glycols prepared from blends or sequential addition of two or more alkylene oxides. Also, adducts of the above with trimethylolpropane, glycerine and hexanetriol as well as the polyoxypropylene adducts of higher polyols such as pentaerythritol and sorbitol may be employed. Thus, the polyether polyols which can be employed in this process are oxyalkylene polymers which have an oxygen/carbon atom ratio from about 1:2 to 1:4 and preferably an oxygen/carbon atom ratio from about 1:2.8 to 1:4 and from about 2 to 6 terminal hydroxyl groups and preferably about 2 to 4 terminal hydroxyl groups. The polyether polyols generally have an average equivalent weight from about 150 to 5000 and preferably have an average equivalent weight from about 200 to 2000. Polyoxypropylene glycols having molecular weights from about 400 to 2500 corresponding to equivalent weights from about 200 to 1250 and mixtures thereof are particularly useful as polyol reactants. Also, polyol blends such as a mixture of high molecular weight polyether polyols with lower molecular weight polyether polyols or monomeric polyols can be used in preparing polyurethane-urea foams having good properties.

The organic isocyanates which can be employed in preparing the polyurethane foams include, for example, polymethylene diisocyanates such as tetramethylene diisocyanate and hexamethylene diisocyanate and aromatic diisocyanates such as tolylene diisocyanate, 4,4'-diphenylmethane diisocyanate, 1,5-naphthalene diisocyanate, crude tolylene diisocyanate, crude 4,4'-diphenylmethane diisocyanate and adducts of tolylene diisocyanate with polyols such as ethylene glycol, dipropylene glycol, trimethylolpropane, neopentylglycol and polypropylene glycols. The organic isocyanate is used in an amount which provides an NCO/OH ratio from about 0.9:1 to 1.5:1, preferably an NCO/OH ratio from about 1:1 to 1.2:1. The expression NCO/OH ratio as employed herein may be defined as the ratio of total —NCO equivalent to total active hydrogen equivalent (i.e., hydroxyl plus water).

In a one-shot process a metallo-organic salt catalyst is usually employed which is a polyvalent metal salt of an organic acid having up to about 18 carbon atoms and being void of active hydrogen atoms. The organo portion of the salt may be either linear or cyclic and saturated or unsaturated. The polyvalent metal has a valence from about 2 to 4. Typical metallo-organic salts include stannous acetate, stannous butyrate, stannous 2-ethylhexoate, stannous laurate, stannous oleate, stannous stearate, lead cyclopentane carboxylate, cadmium cyclohexane carboxylate, lead naphthenate, cobalt naphthenate, zinc naphthenate, cadmium naphthenate, dibutyltin dilaurate, dibutyltin-di-2-ethylhexoate, mercury propionate and the like. Tertiary amines such as triethylene diamine and tetramethylethylene diamine are advantageously used in conjunction with the metallo-organic salts as catalysts for the "one-step" method described herein.

The metallo-organic salt catalyst is used in an amount by weight corresponding to about 0.025 to 1.0 percent based upon the weight of polyether polyol and preferably in an amount by weight corresponding to about 0.05 to 0.5 percent of the weight of polyether polyol.

Any of the known wetting agents or surface active agents, commonly employed in the production of high grade polyurethane foam, may be employed in this invention. Nonionic surface active agents and wetting agents are preferred. Of these, the solid or liquid organosilicones have been found particularly desirable.

The quantity of surface active agent or wetting agent in the reaction mixture is also of significance, although this will vary somewhat depending upon the efficiency of the wetting agent. Generally, from about 0.5 to about 2.0 percent of surface active agent by weight of total reactants is adequate. Below the lower amounts, the foams have a tendency toward large and uneven cell structure, while more than about 2.0 percent does not improve foam properties and appears somewhat to decrease foam strength.

As previously pointed out, the foaming agent may be water whereby carbon dioxide is released by the water-isocyanate reaction, a solvent-type foaming agent, air or gases which are inert with respect to the reactants, e.g., nitrogen. Also, blowing agents which liberate inert gases such as nitrogen, e.g., N,N'-dinitrosopentamethylenetetramine, may be employed. The solvent-type foaming agent should be one which is inert to all but soluble or dispersible in at least one of the reactants and insoluble in the final polyurethane foam.

The halogenated alkanes possess all of the necessary characteristics and are particularly well adapted to be used as blowing solvents with facility. Fluorotrichloromethane, having a boiling point of about 75° F., has been found especially suitable as the blowing solvent, and has the advantage, as do many of the halogenated alkanes of the "Freon" or "Genetron" type, of solubility in, or compatibility with, the glycol or polyol or prepolymer or in the isocyanate component.

The following examples further illustrate the invention.

The properties of the foams produced in the following examples were measured in accordance with ASTM designation D–156–64T with the exception of Roller Shear Fatgiue properties which were measured by Fisher Body Methods 46–8.

EXAMPLE I

A series of polyurethane foams having the compositions indicated in Table I below are prepared as follows:

The polyethylene powder is first mixed with the polyol to form component A and the water and amine mixed together along with the silicone surface active agent to form component B. These two components are then mixed with the stannous octoate catalyst and the toluene diisocyanate, the over-all mixture poured into a mold and the foam allowed to rise to its full height. The foams are cured 5 hours at 250° F. and stored 5 days at room temperature before testing. In this manner flexible foams characterized by a good open-celled structure with no splits are produced. A comparison of composition Nos. 2 and 3 with composition No. 1 in Table I below illustrates that the inclusion of the polyethylene powder provides a definite increase in load-bearing properties without significant loss of other properties. All quantities in Table I below are in parts by weight except for toluene diisocyanate which is in terms of TDI index (NCO/OH ratio).

TABLE I

| | Composition No. | | |
|---|---|---|---|
| | 1 | 2 | 3 |
| Ingredients: | | | |
| Polyol (1) | 100 | 100 | 100 |
| Triethylene diamine (2) | 0.4 | 0.4 | 0.4 |
| Polyethylene (3) | | 20 | |
| Polyethylene (4) | | | 20 |
| Surface active agent (5) | 1.1 | 1.1 | 1.1 |
| Water | 3.0 | 3.0 | 3.0 |
| Stannous octoate | 0.15 | 0.20 | 0.20 |
| TDI index | 1.05 | 1.05 | 1.05 |
| Properties: | | | |
| Density, lbs./cu. ft. | 2.04 | 2.38 | 2.55 |
| Tensile strength, p.s.i. | 14.3 | 13.4 | 13.1 |
| Elongation, percent | 230 | 190 | 177 |
| Compression load, p.s.i.: | | | |
| 25% deflection | 0.45 | 0.58 | 0.56 |
| 65% deflection | 0.77 | 1.19 | 1.08 |
| Compression set, percent: | | | |
| 50% deflection | 9.2 | 7.1 | 9.7 |
| 90% deflection | 8.1 | 8.0 | 8.2 |

In Table I the components indicated by numerals, e.g., (1) are as follows:
(1) Propylene oxide-ethylene oxide adduct of glycerol having a hydroxyl number of 47 and a molecular weight as determined by hydroxyl number of 3,570;
(2) Triethylene diamine mixed with dipropylene glycol in a weight ratio of 1:2;
(3) (4) Polyethylene powders which may be described as follows:

| | Composition No. | |
|---|---|---|
| | 3 | 4 |
| Molecular weight (wt. average) | 440,000 | 370,000. |
| Melt index (g./10 min.) | 22 | 5. |
| Density (g./cu. cm.) | 0.915 | 0.924. |
| Bulk density (pcf.) | 17–20 | 17–20. |
| Vicat softening, temp., °C | 81 | 97. |
| Particle shape | Spherical | Spherical. |
| Average particle size (micron) | <20 | <30. |
| Volatiles (max. percent) | 0.1 | 0.1. |
| Color | White | White. |

(5) Silicone surface active agent sold under the designation Dow Corning 190, described in Bulletin No. 05-128, published by Dow Corning, Midland, Mich., June 1965. This product may be described as a silicone cell control additive and foam stabilizer for flexible urethane foams having the following properties:

Viscosity at 77° F., centistokes _____ 1,000–1,500.
Specific gravity at 77° F _____ 1.035–1.040.
Refractive index at 77° F _____ 1.4500.
Color, Gardner scale _____ 1 to 6.
Hydroxyl content, percent (phthalic anhydride method) _____ Nil.
Water solubility _____ Completely soluble.
Water stability _____ Stable in solution.

EXAMPLE II

A series of polyurethane foams having the compositions indicated in Table II below are prepared as follows:

The polyethylene powder and the polyol are mixed together to form component A, and the water and amine catalysts are mixed together to form component B. Component A, component B, and the remaining ingredients shown in Table II below are further mixed in a conventional foam machine and poured into 20″ x 40″ x 6″ free rise boxes to simulate slab foam operation. All quantities in Table II below are in parts by weight except for toluene diisocyanate which is in terms of TDI Index (NCO/OH ratio). After curing 15 minutes above 300° F., the foams are characterized by a good open-celled structure with no splits, and have the properties shown in Table II below. As can be seen from Table II, the foams containing polyethylene powder have excellent load-bearing properties and the strength properties, while lower than for conventional unfilled foams, nevertheless are superior to known filled foams.

TABLE II

| | Composition No. | | | |
|---|---|---|---|---|
| | 1 | 2 | 3 | 4 |
| Ingredients: | | | | |
| Polyol (1) | 100 | 100 | 100 | 100 |
| Polyethylene (3) | | 20 | 20 | |
| Polyethylene (4) | | | | 20 |
| Water | 3.09 | 3.09 | 3.09 | 3.09 |
| Surface active agent (5) | 1.1 | 1.1 | 1.1 | 1.1 |
| Triethylene diamine (2) | 0.30 | 0.30 | 0.30 | 0.30 |
| N ethyl morpholine | 0.15 | 0.15 | 0.15 | 0.15 |
| Stannous octoate | 0.33 | 0.30 | 0.33 | 0.33 |
| Diisodecyl phthalate | 2.97 | 2.70 | 2.97 | 2.97 |
| TDI index | 1.05 | 1.05 | 1.05 | 1.05 |
| Properties: Density (lb./cu. ft.) | 1.91 | 2.35 | 2.21 | 2.09 |
| Physical properties: | | | | |
| Tensile strength (p.s.i.) | 18.0 | 15.8 | 13.4 | 13.1 |
| Percent elongation | 397 | 277 | 280 | 260 |
| Tear (lb./inch) | 4.1 | 3.4 | 3.2 | 2.9 |
| Percent resilience | 41.7 | 46.4 | 38.4 | 41.1 |
| I.L.D. test (lb./50 sq. in.): | | | | |
| Sample thickness (inches) | 1.955 | 1.995 | 1.990 | 1.985 |
| Load at: | | | | |
| 25% deflection | 24.4 | 29.7 | 25.3 | 28.5 |
| 65% deflection | 45.5 | 63.3 | 54.4 | 72.0 |
| 15% return | 17.5 | 20.9 | 17.5 | 19.8 |
| Sag factor | 1.86 | 2.13 | 2.15 | 2.52 |
| Guide factor | 12.8 | 12.7 | 11.5 | 13.7 |
| Percent recovery | 71.6 | 70.4 | 69.2 | 69.5 |
| Compression sets: | | | | |
| Percent set at: | | | | |
| 50% compression | 4.9 | 5.4 | 5.3 | 5.1 |
| 90% compression | 9.7 | 6.0 | 19.2 | 25.6 |

NOTE—In Table II the ingredients indicated by numerals, e.g., (1), are the same as in Table I, Example I.

EXAMPLE III

A series of polyurethane foams having the compositions indicated in Table III below are prepared as follows:

The polyethylene powder and the polyol are mixed together to form component A, and the water and amine catalysts are mixed together to form component B. Component A, component B and the remaining ingredients shown in Table III below are further mixed in a conventional foam machine and poured into a cast aluminum topper pad mold. All quantities in Table III below are in parts by weight except for toluene diisocyanate which is in terms of TDI Index. The initial temperature of the mold is 110° F. A floating lid technique is employed. After curing 15 minutes between 300 and 340° F., the molded pads were stripped from the mold. Release characteristics of foams containing polyethylene powder were excellent even with a minimum use of mold release compound. Polyethylene containing foams had better definition and a more continuous uniform skin than the controls. Physical properties of the foams are shown in Table III below. As can be seen from Table III, the foams containing polyethylene powder have excellent load-bearing properties and improved fatigue characteristics.

ylene oxide having a hydroxyl number of 37 and a molecular weight of 4500 is employed in lieu of 50 parts of propylene oxide-ethylene oxide adduct of glycerol having a hydroxyl number of 47 and a molecular weight as deter-

TABLE III

| | Composition No. | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Ingredients: | | | | | | | | | | | | |
| Polyol (1) | 100 | 100 | 100 | 100 | 100 | 100 | 100 | 100 | 100 | 100 | 100 | 100 |
| Polyethylene (3) | | | 20 | 20 | | | | | 40 | 40 | | |
| Polyethylene (4) | | | | | 20 | 20 | | | | | 40 | 40 |
| Water | 3.09 | 3.09 | 3.09 | 3.09 | 3.09 | 3.09 | 3.0 | 3.0 | 3.0 | 3.0 | 3.0 | 3.0 |
| Surface active agent (5) | 1.1 | 1.1 | 1.1 | 1.1 | 1.1 | 1.1 | 1.1 | 1.1 | 1.1 | 1.1 | 1.1 | 1.1 |
| Triethylene diamine (2) | 0.3 | 0.3 | 0.3 | 0.3 | 0.3 | 0.3 | 0.30 | 0.30 | 0.30 | 0.30 | 0.30 | 0.30 |
| N ethyl morpholine | 0.15 | 0.15 | 0.15 | 0.15 | 0.15 | 0.15 | 0.15 | 0.15 | 0.15 | 0.15 | 0.15 | 0.15 |
| Stannous octoate | 0.30 | 0.33 | 0.30 | 0.33 | 0.30 | 0.33 | 0.30 | 0.35 | 0.45 | 0.50 | 0.45 | 0.50 |
| Diisodecyl phthalate | 2.70 | 2.97 | 2.70 | 2.97 | 2.70 | 2.97 | 2.70 | 3.15 | 4.05 | 4.50 | 4.05 | 4.50 |
| TDI index | 1.05 | 1.05 | 1.05 | 1.05 | 1.05 | 1.05 | 1.05 | 1.05 | 1.05 | 1.05 | 1.05 | 1.05 |
| Properties: Density (lb./cu. ft.) | 2.10 | 2.09 | 2.58 | 2.40 | 2.40 | 2.33 | 1.93 | 1.95 | 2.85 | 2.72 | 2.62 | 2.53 |
| Physical properties: | | | | | | | | | | | | |
| Tensile strength (p.s.i.) | 25.9 | 26.1 | 17.9 | 19.9 | 17.2 | .15.6 | 18.2 | 15.8 | 16.0 | 14.9 | 13.7 | 12.8 |
| Percent elongation | 426 | 427 | 254 | 286 | 268 | 268 | 410 | 409 | 232 | 234 | 223 | 210 |
| Tear (lb./inch) | 4.0 | 4.1 | 3.3 | 3.1 | 3.1 | 3.1 | 3.4 | 3.1 | 2.7 | 2.6 | 2.4 | 2.3 |
| I.L.D. test (lb./50 sq. in.): | | | | | | | | | | | | |
| Sample thickness (inches) | 2.257 | 2.297 | 2.457 | 2.547 | 2.570 | 2.640 | 2.733 | 2.637 | 2.557 | 2.767 | 2.770 | 2.883 |
| Load at: | | | | | | | | | | | | |
| 25% deflection | 27.7 | 27.1 | 38.7 | 34.6 | 38.5 | 36.6 | 24.2 | 23.6 | 42.9 | 41.3 | 48.1 | 44.6 |
| 50% deflection | 46.5 | 45.9 | 68.0 | 60.7 | 65.1 | 51.9 | 40.6 | 38.9 | 76.2 | 73.2 | 81.5 | 76.5 |
| 65% deflection | 77.1 | 74.1 | 111.7 | 97.4 | 104.9 | 97.0 | 61.0 | 59.4 | 124.7 | 116.6 | 125.5 | 117.9 |
| 25% return | 20.8 | 20.1 | 28.4 | 24.5 | 27.4 | 25.4 | 17.8 | 16.8 | 29.9 | 27.6 | 30.8 | 27.8 |
| Sag factor | 2.78 | 2.74 | 2.88 | 2.81 | 2.73 | 2.65 | 2.52 | 2.52 | 2.91 | 2.82 | 2.61 | 2.64 |
| Guide factor | 13.2 | 12.9 | 15.0 | 14.4 | 16.0 | 15.7 | 12.5 | 12.1 | 15.1 | 15.2 | 18.4 | 17.6 |
| Percent recovery | 75.0 | 74.1 | 73.2 | 70.6 | 71.3 | 69.6 | 73.7 | 71.3 | 69.7 | 66.8 | 64.1 | 62.4 |
| Compression sets: | | | | | | | | | | | | |
| Percent set at: | | | | | | | | | | | | |
| 50% compression | 9.8 | 11.7 | 8.5 | 9.3 | 7.5 | 7.7 | 16.1 | 14.8 | 10.2 | 11.5 | 9.1 | 10.7 |
| 90% compression | 9.9 | 12.0 | 9.2 | 14.7 | 7.8 | 8.3 | 22.5 | 33.2 | 49.0 | 88.0 | 74.8 | 89.0 |
| Roller shear fatigue, method Fisher 46-8, percent change in: | | | | | | | | | | | | |
| 1 lb. loaded height | −0.8 | 0.0 | 0.0 | 0.0 | −0.4 | −0.6 | −0.1 | −1.1 | 0.1 | −0.4 | −0.3 | −0.9 |
| 25 lb. loaded height | 22.3 | 21.2 | 13.5 | 18.3 | 8.7 | 12.0 | 25.3 | 26.0 | 8.6 | 11.4 | 2.1 | 4.0 |
| 50 lb. loaded height | 18.9 | 17.2 | 20.9 | 23.2 | 18.8 | 21.2 | 20.9 | 21.1 | 16.7 | 16.4 | 17.2 | 17.6 |

NOTE—In Table III, the ingredients indicated by numerals, e.g., 1, are the same as in Table (I), Example I.

EXAMPLE IV

A further foam is produced in exactly the manner of Example II with the exception that xylylene diisocyanate is employed in lieu of the toluene diisocyanate. The foam is characterized by a good open-celled structure with no splits.

EXAMPLE V

A further foam is produced in exactly the manner of Example II with the exception that 4,4'-diphenylmethane diisocyanate is employed in lieu of the toluene diisocyanate. The foam is characterized by a good open-celled structure with no splits.

EXAMPLE VI

A further foam is produced in exactly the manner of Example II with the exception that the propylene oxide adduct of glycerol having a molecular weight of 3000 is employed in lieu of the propylene oxide-ethylene oxide adduct of glycerol having a hydroxyl number of 47 and a molecular weight as determined by hydroxyl number of 3570. The foam is characterized by a good open-celled structure with no splits.

EXAMPLE VII

A further foam is produced in exactly the manner of Example II with the exception that 20 parts of polyoxypropylene glycol having a hydroxyl number of 56 and a molecular weight of 2000 is employed in lieu of 20 parts of propylene oxide-ethylene oxide adduct of glycerol having a hydroxyl number of 47 and a molecular weight as determined by hydroxyl number of 3570. The foam is characterized by a good open-celled structure with no splits, excellent molding characteristics including a more uniform continuous skin and heat sealability.

EXAMPLE VIII

A further foam is produced in exactly the manner of Example II with the exception that 50 parts of propylene oxide adduct of trimethylolpropane terminated with ethmined by hydroxyl number of 3570. The foam is characterized by a good open-celled structure with no splits, excellent molding characteristics including a more uniform continuous skin and heat sealability.

EXAMPLE IX

A further foam is produced in exactly the manner of Example II with the exception that 40 parts of a propylene oxide adduct of pentaerythritol having a hydroxyl number of 56 and a molecular weight of 3000 is employed in lieu of 40 parts of propylene oxide-ethylene oxide adduct of glycerols having a hydroxyl number of 47 and a molecular weight as determined by hydroxyl number of 3570. The foam is characterized by a good open-celled structure with no splits, excellent molding characterics including a more uniform continuous skin and heat sealability.

EXAMPLE X

A further foam is produced in examctly the manner of Example II with the exception that 100 parts of polyethylene powder (4) is employed in lieu of the 20–40 parts of polyethylene powders (3) and (4). The foam is characterized by a good open-celled structure with no splits.

EXAMPLE XI

A further foam is produced in exactly the manner of Example II with the exception that 40 parts of polyethylene powder of 800,000 weight average molecular weight and a particle size of 500 microns is employed in lieu of the 20–40 parts of polyethylene powders (3) and (4). The foam is characterized by a good open-celled structure with no splits.

EXAMPLE XII

A further foam is produced in exactly the manner of Example II with the exception that 5 parts of polyethylene powder (4) is employed in lieu of the 20–40 parts of polyethylene powders (3) and (4). The foam is characterized by a good open-celled structure with no splits.

What is claimed is:

1. Resilient cellular material comprising a cellular mass of resilient polyurethane and finely divided particulate polyethylene resin material of a molecular weight range of from about 100,000 to 1,000,000, and a particle size range of from about 3 to 1000 microns dispersed in said mass of resilient polyurethane in an amount of from about 2 to 50% of the total weight of the foam product.

2. The resilient cellular material of claim 1 wherein the dimensions of the particles of finely divided polyethylene range from about 3 to 50 microns.

References Cited

UNITED STATES PATENTS 3,441,523  4/1969  Dwyer et al. _____ 260—2.5

FOREIGN PATENTS 1,444,781  5/1966  France _____ 260—2.5AG

DONALD E. CZAJA, Primary Examiner

C. W. IVY, Assistant Examiner